W. LINQUIST & M. L. CORBETT.
FREIGHT CAR CONSTRUCTION.
APPLICATION FILED MAR. 16, 1917.
1,247,553.
Patented Nov. 20, 1917.
2 SHEETS—SHEET 1.
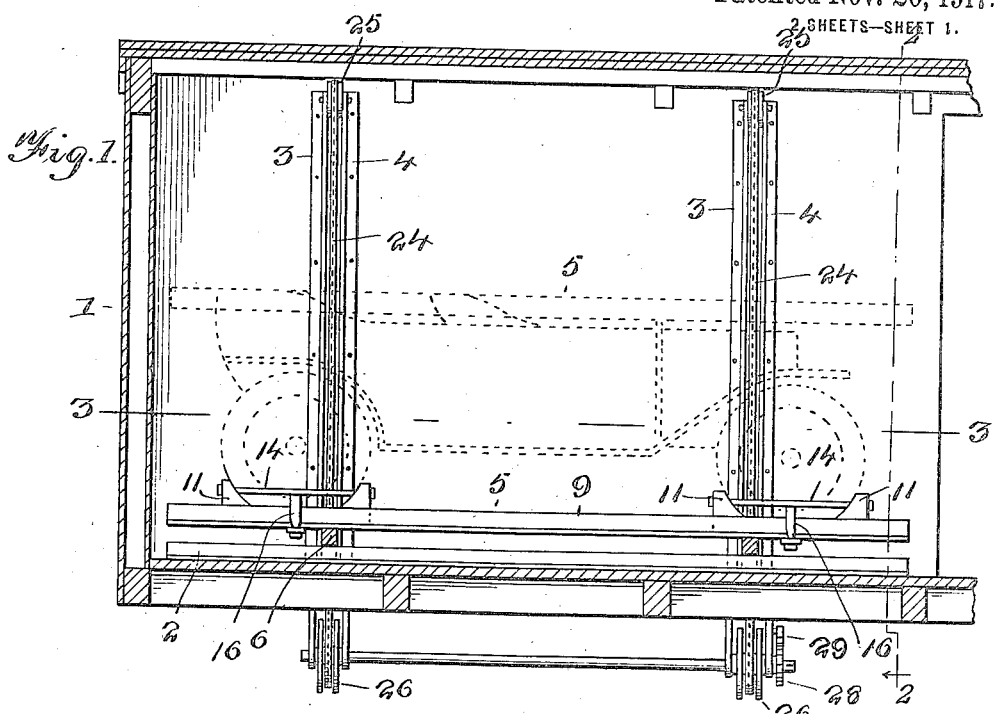
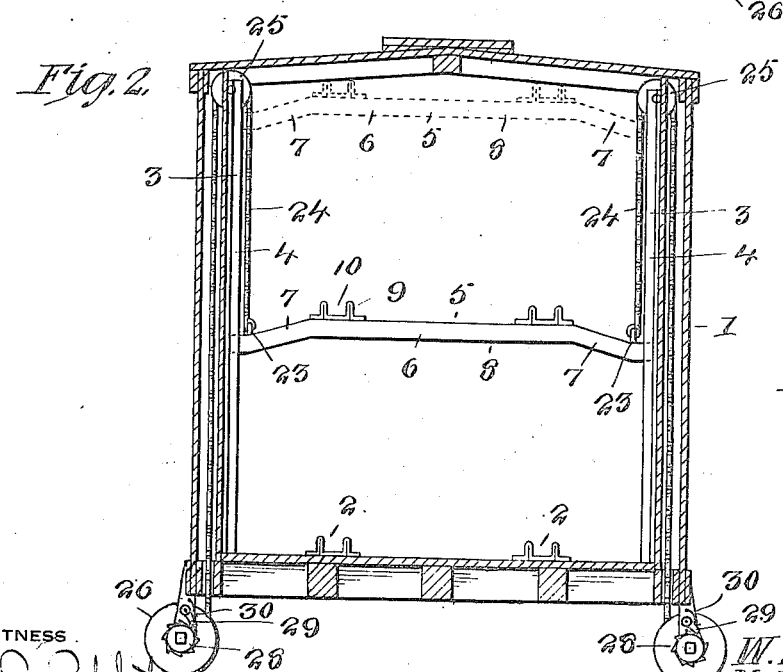
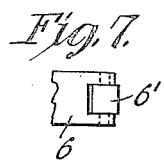
INVENTOR
W. Linquist
M. L. Corbett
BY Victor J. Evans
ATTORNEY
WITNESS W. LINQUIST & M. L. CORBETT.
FREIGHT CAR CONSTRUCTION.
APPLICATION FILED MAR. 16, 1917.
1,247,553.
Patented Nov. 20, 1917.
2 SHEETS—SHEET 2.
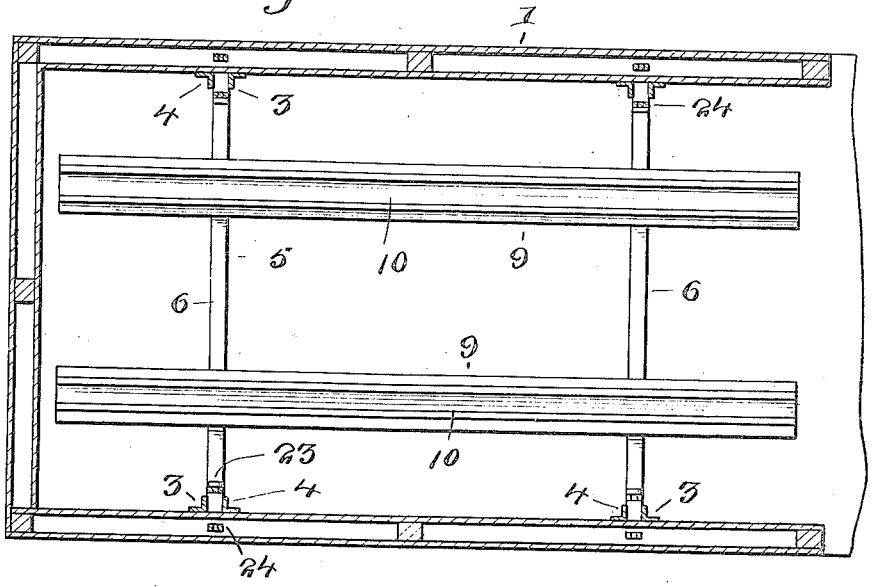
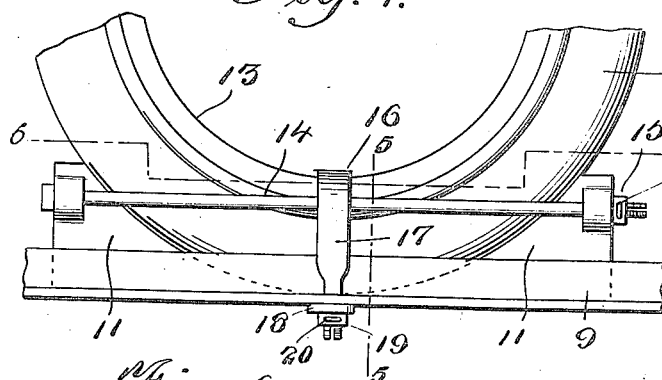
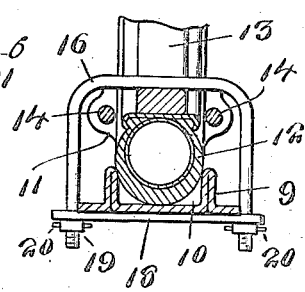
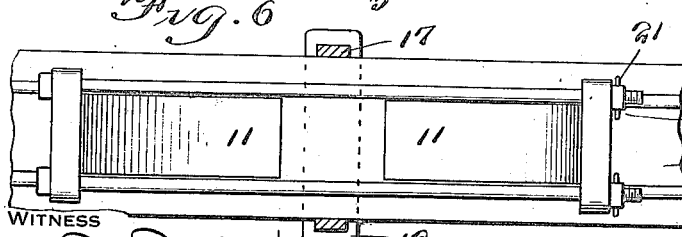
INVENTOR
W. Linquist
M. L. Corbett
BY Victor J. Evans
ATTORNEY

UNITED STATES PATENT OFFICE.

WILLIAM LINQUIST AND MELVILLE L. CORBETT, OF CLEVELAND, OHIO.

FREIGHT-CAR CONSTRUCTION.

1,247,553.      Specification of Letters Patent.      Patented Nov. 20, 1917.

Application filed March 16, 1917. Serial No. 155,336.

*To all whom it may concern:*

Be it known that we, WILLIAM LINQUIST and MELVILLE L. CORBETT, citizens of the United States, residing at Cleveland, in the county of Cuyahoga and State of Ohio, have invented new and useful Improvements in Freight-Car Constructions, of which the following is a specification.

This invention relates to improvements in freight car construction, and is particularly directed to that class of cars employed for transporting automobiles.

The primary object of the invention is to produce a construction whereby a car may be employed for holding two or more automobiles which are arranged one above the other, so that at least two automobiles can be thus transported without occupying undue space as would be occasioned if the automobiles were arranged side by side or end to end.

It is a further object of the invention to provide an ordinary box car with a vertically movable platform having grooved rails thereon to receive the wheels of an automobile, means being provided for effectively chocking and securing the said wheels of the automobile upon the said rails, and means being also provided whereby to elevate the platform and positively retain the same in its said elevated position, regardless of the shock and jar to which the car is subjected in its travel so that the elevated automobile will be effectively sustained and also whereby ample space will be permitted below the platform for the reception of other vehicles or other merchandise.

It is a further object of the invention to provide an ordinary freight car with a platform which when not employed as a platform for merchandise may be raised against the roof of the car and retained in this position.

It is a still further object of the invention to produce a device of this character which shall be of a simple nature, which may be readily and easily applied to any ordinary construction of box cars, which may be cheaply manufactured and which will perform the functions for which it is devised with efficiency and with certainty.

With the above and other objects in view the improvement resides in the construction, combination and arrangement of parts set forth in the following specification and falling within the scope of the appended claims.

In the drawings:

Figure 1 is an approximately central vertical longitudinal sectional view through a box car provided with our improvement, the platform being illustrated by the dotted lines in its elevated position, Fig. 2 is a transverse sectional view on the line 2—2 of Fig. 1, the platform being illustrated in its elevated position and being indicated by the dotted lines in its fully raised position against the top of the car, as when not in use, Fig. 3 is a horizontal sectional view approximately on the line 3—3 of Fig. 1, Fig. 4 is a detail side elevation illustrating the manner of locking the wheel of an automobile to one of the channeled tracks of the platform.

Fig. 5 is a sectional view approximately on the line 5—5 of Fig. 4,

Fig. 6 is a sectional view approximately on the line 6—6 of Fig. 4, the wheel being removed, and Fig. 7 is a detail plan view on the end of one of the transverse members of the movable platform illustrating the anti-frictional element associated therewith.

The car 1 is of the ordinary box construction, and as the same is primarily intended for the transportation of automobiles, the same may have arranged upon its floor grooved tracks 2 to receive the wheels of the automobile, suitable mechanism, hereinafter to be described in detail, being employed for chocking the wheels of the automobile and for locking the same to the track.

Upon the sides of the car 1 and disposed diametrically opposite one another are vertically arranged ways 3—3, the same being preferably provided by employing a pair of spaced angle bars 4, securing one of the flanges thereof to the sides of the car so that their opposite flanges are disposed in spaced relation and project inwardly of the car.

The movable platform is broadly indicated by the numeral 5 and comprises a pair of transverse members 6—6 which have their ends arranged in ways provided by the angle bars, and if desired suitable anti-friction members, such as rollers 6', may be arranged upon the ends of the said members 6. These members from their ends are extended angularly in an upward direction, as indicated by the numerals 7, the connecting member 8 for the said angular portion being horizontally straight as clearly illustrated by the drawings. By this construction the members 6 are substantially arch-shaped in side elevation, corresponding to the cross sectional shape of the roof of the car, as it is desired to retain the platform against the said roof when not employed as a support for an automobile. Connecting the transverse members 6, and, of course, arranged longitudinally with respect to the car, are the tracks 9, the said tracks each comprising a grooved member, and the vertical flanges 10 of the said tracks are of a sufficient width to fully receive the rims or tires of the wheels of the automobile. Between the flanges 10 are arranged shoe or chock members 11—11 having their inner faces conforming to the rounded shape of the rim or tire 12 of the automobile wheels 13. The members 11 are, of course, arranged in pairs so that one pair of the same contacts with the opposite sides of the tire of the automobile wheel, and in order to properly adjust the shoe members 11 with respect to the rims of the wheels, we provide the same with longitudinally adjustable elements, such as bolts 14 upon which are threaded nuts 15, the said bolts being arranged in pairs so that one of the same will contact with each of the opposite sides of the tire or rim 12 of the wheel 13. In addition to this we provide clip members 16 that are adapted to straddle the rim and tire of the wheel and to also straddle the sides of the track 9, the legs 17 of the said clips being threaded and receiving a plate 18 which contacts with the under surface of the tracks 9, while screwed upon the said threaded ends 17 of the arms of the clip and binding against the plate 18 are nuts 19. Any suitable locking means may be employed for the nuts, as for instance, the legs of the clip members may be slotted and the nuts may be provided with openings through which are passed securing elements, preferably in the nature of cotter pins 20, that also pass through the slots in the legs of the said clips. In a like manner the bolt members 14 may be provided with slots or openings, and the nuts 15 provided with transverse openings which are adapted to register with the slots in the said bolts and locking elements, such as cotter pins 21, are passed through the alining openings and thus the nuts are effectively locked to the bolts so that danger of the outward movement of the chock members 11 will be effectively overcome.

The transverse members 6 of the platform 5, adjacent the ends thereof, are provided with eyes 23 which receive the ends of the flexible members, such as chains 24, the said chains passing over suitable grooved wheels 25 that are journaled on shafts arranged above the sides of the car at the top of the said car, and the chains or flexible elements 24 are wound around suitable drums 26 that have their axles journaled in suitable bearings upon the sides of the car, and each shaft has one of its ends squared and the said squared end may, if desired, pass through a suitable opening in the side of the car, the squared end being adapted to receive the socket of a suitable wrench or lever. Upon each of the shafts 27 is preferably disposed a ratchet wheel 28 that is engaged by a dog 29, suitable means, such as a spring 30, being provided for retaining the dog in engagement with the teeth of the ratchet. It is, of course, to be understood that other means may be provided for operating the movable platform and also that other means may be provided for locking the said movable platform in its raised position.

Having thus described the invention, what we claim is:

1. In combination with a box car having ways upon the inner sides thereof disposed diametrically opposite each other, of a movable platform including transversely arranged members having their ends received in the ways, anti-frictional buffer elements upon the ends of the said members, longitudinally arranged grooved tracks secured to the members, shoes arranged in pairs and adapted to be received upon the tracks, means for adjusting the shoes toward or away from each other, clip members disposed approximately central between each pair of shoes and straddling the tracks, and means for adjustably securing the clips to the tracks.

2. In combination with a box car having ways upon the inner sides thereof disposed diametrically opposite each other, of a movable platform including transversely arranged members having their ends received in the ways, longitudinally arranged grooved tracks secured to the said members, shoes arranged in pairs and adapted to be received upon the tracks, longitudinally disposed adjustable means connecting each pair of shoes, and whereby the said shoes may be relatively adjusted with respect to each other, clip members disposed approximately central between each pair of shoes and straddling the connecting members for the shoes and the tracks, and means for adjustably securing the clips to the tracks.

In testimony whereof we affix our signatures.

MELVILLE L. CORBETT.
WILLIAM LINQUIST.